G. HAZELTON.
SLIDING MECHANISM.
APPLICATION FILED DEC. 15, 1920.

1,390,904.

Patented Sept. 13, 1921.

INVENTOR
G. Hazelton.
by
Atty.

UNITED STATES PATENT OFFICE.

GEORGE HAZELTON, OF PORTADOWN, IRELAND.

SLIDING MECHANISM.

1,390,904.  Specification of Letters Patent.  Patented Sept. 13, 1921.

Application filed December 15, 1920.  Serial No. 431,017.

*To all whom it may concern:*

Be it known that I, GEORGE HAZELTON, a British subject, residing at Portadown, county Armagh, Ireland, have invented certain new and useful Improvements in Sliding Mechanisms, of which the following is a specification.

This invention relates to sliding mechanisms comprising a male and female part having axial sliding engagement and has for its object to provide means whereby the said parts may be temporarily or permanently locked in any adjusted position.

According to the invention the male part is provided with one or more axial grooves leaving one or more ribs on the periphery of which are formed threads or serrations. The female part consists of two elements which are capable of relative rotary movement, one element having one or more internal ribs slidably engaged in the grooves of the male member and the second element being provided with one or more internal ribs corresponding to the grooves of the male member having threads or serrations adapted on rotation of the said element, to enter into operative engagement with those of the said male member, so as to lock the two male and female members together. The said elements of the female member may be in contact with each other or, alternatively, the two elements may be mounted in a common part of the same mechanism or device or in different parts of the said mechanism or device or in different mechanisms or devices.

Figure 1:
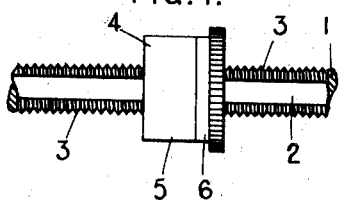
Figure 2:
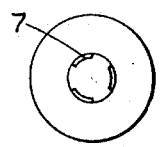
Figure 3:
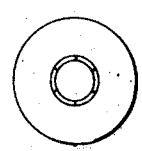
Figure 4:
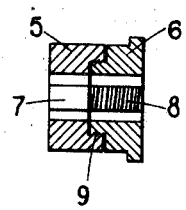
Figure 5:
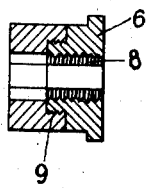
Figure 6:
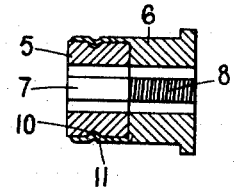
Figure 7:
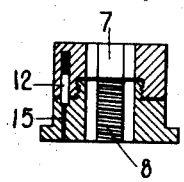
Figure 8:
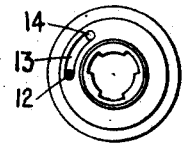
Figure 9:
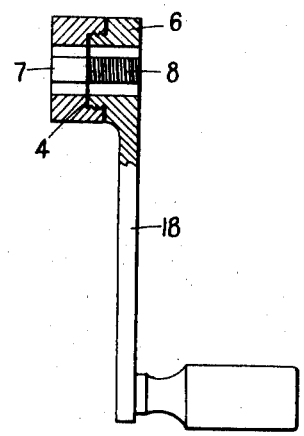
Figure 10:
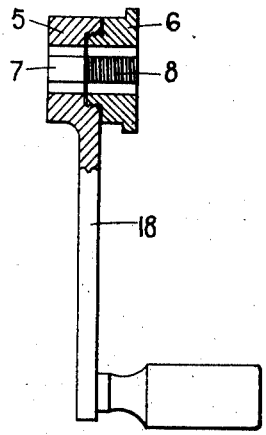

The invention is illustrated in the accompanying drawings in which Figures 1, 2 and 3 represent separate views of one modification. Figs. 4 and 5 illustrate sectional views of the female member with the elements set in the sliding and locked position respectively. Figs. 7 and 8 illustrate a detail. Figs. 6, 9 and 10 represent modifications.

Referring now to Figs. 1 to 5 of the drawings, the first or male member 1 comprises a screwed bar, rod, shaft, or the like having one or more axial grooves or recesses 2 leaving one or more ribs, on the outer periphery of which are formed threads or serrations. The second or female member 4 comprises two elements 5, 6 of which the first element 5 is provided with one or more internal ribs 7 slidably engaged with the grooves 2 of the member 1. The second element 6 is also provided with one or more internal ribs 8 capable when set in register with the grooves 2 of permitting the member 4 to slide freely on the shaft 1. The surface of the ribs 8 is formed with threads or serrations capable of operative engagement with those of the member 1. It will be seen therefore, that when the elements 5, 6 occupy the positions shown in Figs. 2 and 4, the member 4 will slide freely on the member 1, but when the element 6 is rotated into the position shown in Figs. 3 and 5 the threads or serrations on the ribs 8 will engage with those on the ribs 3 and the two members will be locked together. In the form illustrated, the elements 5, 6 are united together by threads or serrations 9.

Alternatively, as shown in Fig. 6 the said elements may be provided with rotary engagements by means of a groove 10 on the one part, and a flanged collar 11 on the other part. It will be realized that the amount of rotary movement between the two elements requisite for locking the members together is an angular movement subtended by a rib and a groove.

I may, if desired, limit the said angular movement by the provision of a small axial sliding spring-controlled bolt 12 Figs. 7 and 8 in the one part engaging in a shallow slot 13 in the other part. The slot 13 may have a small recess 14 at each end in which the bolt fits in the extreme positions, the surfaces of the recesses being so shaped that on suitably rotating the said parts, the bolt is easily forced out of the said recesses but offers a certain resistance to the initial movements out of the extreme positions.

In Fig. 7 is shown a small hole 15 in which a pin or other tool may be inserted to depress the bolt 12 when fitting the elements together or for disassembling. Alternatively, one end of the slot 13 may be provided with a deeper hole or recess 14 so that when the element is rotated into the locking position the bolt 12 will enter the said recess and permanently lock the parts in the adjusted position. The said bolt may be rendered inaccessible so that the parts cannot again be unlocked.

Referring now to Fig. 9 which shows the invention applied to a handle or crank, the handle member 18 is applied to the rotary element 6 so that when the member 4 is slid over the rod 1 rotation of the handle will first lock the members together, the relative rotation being limited as by the bolt 12 previously described. Further rotation will then rotate the shaft 1.

Alternatively, in Fig. 10 the handle part 18 is applied to the element 5 of the female member. In this modification the element 6 will require to be separately rotated in order to lock the handle device on the shaft.

It will be obvious that the invention as above described may be very widely applied in cases where a quick sliding adjustment combined with a locking or fastening means is required, and it is to be understood that the foregoing description is not intended to limit the nature of the invention to any specific application, but only to illustrate its general principles.

What I claim is:—

1. Sliding mechanism comprising a male and a female member, wherein the male member is formed with an axial groove leaving an axial rib, transverse threads or serrations being formed on the surface of said rib, and the female member comprises two elements rotatably mounted together whereof one element has an internal rib slidably engaged in the groove of said male member, and the other element is provided with an internal rib having threads or serrations adapted, on rotation of said element, to enter into operative engagement with those of the said male member so as to lock the two members together.

2. Sliding mechanism comprising a male and a female member, wherein the male member is formed with a plurality of axial grooves leaving a plurality of axial ribs, transverse threads or serrations being formed on the surface of said ribs, and the female member comprises two elements rotatably mounted together whereof one element has a plurality of internal ribs slidably engaged in the grooves of said male member, and the other element is provided with a plurality of internal ribs having threads or serrations adapted, on rotation of said element, to enter into operative engagement with those of the said male member so as to lock the two members together.

3. Sliding mechanism comprising a male and a female member, wherein the male member is formed with a plurality of axial grooves leaving a plurality of axial ribs, transverse threads or serrations being formed on the surface of said ribs, and the female member comprises two elements mounted in such a manner as to be capable of relative rotary movement about the axis of the male member whereof one element has a plurality of internal ribs slidably engaged in the grooves of said male member, and the other element is provided with a plurality of internal ribs having threads or serrations adapted, on rotation of said element, to enter into operative engagement with those of the said male member so as to lock the two members together.

4. Sliding mechanism comprising a male and a female member, wherein the male member is formed with a plurality of axial grooves leaving a plurality of axial ribs, transverse threads or serrations being formed on the surface of said ribs, and the female member comprises two elements mounted in such a manner as to be capable of relative rotary movement about the axis of the male member whereof one element has a plurality of internal ribs slidably engaged in the grooves of said male member, and the other element is provided with a plurality of internal ribs having threads or serrations adapted, on rotation of said element, to enter into operative engagement with those of the said male member so as to lock the two members together.

5. Sliding mechanism comprising a male and a female member, wherein the male member is formed with a plurality of axial grooves leaving a plurality of axial ribs, transverse threads or serrations being formed on the surface of said ribs, and the female member comprises two elements rotatably mounted together whereof one element has a plurality of internal ribs slidably engaged in the grooves of said male member, and the other element is provided with a plurality of internal ribs having threads or serrations adapted, on rotation of said element, to enter into operative engagement with those of the said male member so as to lock the two members together the relative rotation of the two elements being limited by a stop mechanism exercising a certain resistance to movement out of the extreme positions.

6. Sliding mechanism comprising a male and a female member, wherein the male member is formed with a plurality of axial grooves leaving a plurality of axial ribs, transverse threads or serrations being formed on the surface of said ribs, and the female member comprises two elements rotatably mounted together whereof one element has a plurality of internal ribs slidably engaged in the grooves of said male member, and the other element is provided with a plurality of internal ribs having threads or serrations adapted, on rotation of said element, to enter into operative engagement with those of the said male member so as to lock the two members together and an automatic lock mechanism adapted to lock the elements together when the movable element is moved to the locking position.

7. Sliding mechanism comprising a male and a female member, wherein the male member is formed with a plurality of axial grooves leaving a plurality of axial ribs, transverse threads or serrations being formed on the surface of said ribs, and the female member comprises two elements rotatably mounted together whereof one element has a plurality of internal ribs slidably engaged in the grooves of said male member, and the other element is provided with a plurality of internal ribs having threads or serrations adapted, on rotation of said element, to enter into operative engagement with those of the said male member so as to lock the two members together and an automatic inaccessible lock mechanism adapted to lock the elements together when the movable element is moved to the locking position.

In testimony whereof I affix my signature.

GEORGE HAZELTON.